ary Examiner—Stephen J. Novosad
United States Patent [19]
Tate

[11] 3,768,561
[45] Oct. 30, 1973

[54] METHOD FOR CONTROLLING UNCONSOLIDATED SAND IN AN OIL WELL WITH PERMEABLE CEMENT

[75] Inventor: Jack F. Tate, Houston, Tex.

[73] Assignee: Texaco Inc., New York, N.Y.

[22] Filed: Dec. 20, 1971

[21] Appl. No.: 209,887

[52] U.S. Cl. ................................ 166/281, 166/307
[51] Int. Cl. ...................... E21b 43/02, E21b 43/27
[58] Field of Search.................... 166/276, 281, 307, 166/311, 312; 252/8.55 C

[56] References Cited
UNITED STATES PATENTS

| | | | |
|---|---|---|---|
| 3,179,171 | 4/1965 | Beale, Jr. | 252/8.55 C |
| 3,605,899 | 9/1971 | Tate et al. | 166/281 X |
| 3,550,686 | 12/1970 | Knox | 166/307 |
| 2,204,224 | 6/1940 | Limerick et al. | 166/307 UX |
| 3,434,971 | 3/1969 | Atkins | 166/307 X |
| 3,336,981 | 8/1967 | Barron et al. | 166/281 |
| 3,294,765 | 12/1966 | Hort et al. | 166/307 UX |
| 3,428,121 | 2/1969 | Harnsberger | 166/276 |
| 3,429,373 | 2/1969 | Harnsberger et al. | 166/276 |

*Primary Examiner*—Stephen J. Novosad
*Attorney*—Thomas H. Whaley et al.

[57] ABSTRACT

The movement of unconsolidated sand from a subterranean hydrocarbon-containing formation into a wellbore during recovery of the formation hydrocarbon fluids is prevented by forming a permeable, acid-susceptible cement barrier between the formation and the wellbore. The permeability of said acid-susceptible cement barrier or pack traversing a producing formation is improved by treatment with a composition comprised of mineral acid having dissolved therein a vinylpyrrolidone polymer, which composition slowly reacts with acid-soluble components accumulated at the pack face and within the cement pack so that the permeability of the cement barrier to the flow of formation hydrocarbon fluids is increased while adequate mechanical strength and proper pore size to prevent the movement of unconsolidated formation sand into the bore-hole is maintained and recovering formation hydrocarbon fluids from the formation through the formed permeable cement barrier.

25 Claims, No Drawings

METHOD FOR CONTROLLING UNCONSOLIDATED SAND IN AN OIL WELL WITH PERMEABLE CEMENT

FIELD OF THE INVENTION

This invention relates to a method for improving the permeability of acid-susceptible cement packs set into subterranean hydrocarbon-bearing formations. The improvement is accomplished by treatement of said cement pack with a composition comprised of mineral acid having dissolved therein a polymer, which composition reacts slowly to dissolve acid-soluble materials obstructive to fluid movement through the pack faces, or within the packs themselves, thereby facilitating the flow of fluids therethrough and consequently increasing the recovery of hydrocarbons from the formation.

DESCRIPTION OF THE PRIOR ART

The recovery of fluids such as oil and/or gas has been found to be difficult in areas where the subterranean formation is composed of one or more incompetent layers or zones containing unconsolidated sand. These unconsolidated sand particles tend to migrate toward the recovery wellbore during recovery of the formation fluid, and frequently the sand particles block the passageways leading to the wellbore and/or tend to accumulate in the bottom of the wellbore. Plugging or substantially restricting flow of formation fluid toward the wellbore may so drastically decrease the rate of oil recovery that the well must be shut in even though large quantities of oil remain unrecovered from the formation. Unconsolidated sand particles may move with the formation hydrocarbon fluid into the wellbore and be carried along with the fluid through the tubing and pumps to the surface. Since sand particles are very abrasive, this occurrence results in abrasive wear and damage to the tubular goods and mechanical equipment. While unconsolidated sands are found in many oil and gas producing areas, they are most common in offshore and coastal marsh regions of the United States where production is from the more recent geologic sediments, such as the Miocene formation. Such formations usually contain some acid-soluble material.

Various types of mechanical equipment have been utilized in attempts to prevent the movement of unconsolidated sand particles toward the wellbore and/or into the production tubing and associated equipment. These include placement of sand screens, filters, perforated liners and so forth. While these devices have been used with some success, sand migration generally still occurs with plugging the result. Furthermore, these devices tend to interfere with certain types of completions and workover operations. Recently chemical consolidating techniques have been used to achieve consolidation of the formation sands while still providing sufficient permeability for recovery of formation fluids therethrough. These methods generally have consisted of injecting polymerizable resinous material into the underground formation. After these materials polymerize, a barrier is formed which restricts the flow of unconsolidated formation sand and yet sufficient permeability persists to permit recovery of the formation fluid therethrough. These techniques have not met with widespread acceptance becasue of the inherent difficulties of effecting uniform polymerization and even distribution of these resinous materials sufficient to consolidate these unconsolidated formations and at the same time achieve adequate and uniform permeability so as to allow the unrestricted flow of formation fluids therethrough. Furthermore the cost of the resinous materials used for this purpose is relatively high in comparison with prior mechanical methods.

In U. S. Pat. No. 3,428,121 and U. S. Pat. No. 3,429,373 there are disclosed methods of forming permeable cement compositions suitable for use in incompetent formations. These permeable cement compositions are used to form a permeable cement barrier between the unconsolidated hydrocarbon-containing formation so that the formation fluids can be recovered while the sand particles are restrained from entering the wellbore by the permeable barrier. While these materials and procedures have been found to be successful, there are instances when it is desirable to increase further the permeability of the permeable cement barrier produced in accordance with U. S. Pat. No. 3,428,121 or U. S. Pat. No. 3,429,373. More particularly, it is sometimes desirable in the case of new cement packs to use an oil squeeze or acidization treatment to promote initial flow of formation fluids therethrough. By oil squeeze is meant the common field practice of pumping oil through the cement barrier to displace mobile particulate matter from the flow channels, thereby increasing the permeability of the cement barrier. Acidization is the process of pumping mineral acid, usually hydrochloric acid, into the set cement barrier, to dissolve a portion of the cement, thereby enlarging the flow channels and increasing the permeability of the barrier. Such treatment may cause the cement matrix to become so weakened that the cement pack, and indeed the formation itself, may collapse due to excessively rapid erosion by the acid.

SUMMARY OF THE INVENTION

By the method of the present invention one is able to treat effectively the permeable cement barrier so as to increase its permeability while avoiding the disadvantages of these prior art methods.

One object of the present invention is to provide an improved method for increasing permeability more uniformly of a cement pack placed in a wellbore drilled into a hydrocarbon-bearing formation to stabilize said incompetent formation. An additional object is to provide a method for the acid treatment of a cement pack in a wellbore to remove acid-soluble components thereof with a minimum loss in the mechanical strength of the cement pack, thus maximizing the flow of desired fluids and particularly petroleum hydrocarbons therethrough.

According to the present method, a treating composition consisting essentially of a mineral acid having dissolved therein a vinylpyrrolidone polymer which polymer greatly reduces the rate of reaction of the mineral acid with the cement barrier, is injected down the wellbore under pressure and into the set cement barrier. This treating composition is allowed to remain in contact with the cement barrier for sufficient time for the retarted acid to react with the acid-soluble components accumulated at the pack face and within the pack itself, so that the flow channels are enlarged and the permeability of the barrier to the flow of fluids is thereby increased substantially. The method can also be employed in a two-step procedure whereby a slug of the acid-polymer solution is introduced via a wellbore into the cement pack and which is thereafter followed by a slug of brine or water to dilute the acid and thus quench the reaction wherein the succession of slugs is forced into the pack under pressure. After the treatment has been carried out by one of the methods cited above, the well is backflowed and placed on production.

The objective of using this cited treating composition is to achieve uniform controlled reaction of the acid components with the acid-soluble components of the cement barrier and with acid-soluble material accumulated at the pack face. The use of a mineral acid, such as hydrochloric acid, is frequently not satisfactory for this purpose because of its rapid reaction rate with the cement pack. Exposure to a 15 percent hydrochloric acid for even a moderate time results in total disintegration of a hardened sand-cement composition. Use of a dilute mineral acid is likewise unsatisfactory because the acid portion thereof is spent in the portion of the cement-containing barrier first contacted. The section of a cement barrier nearest the wellbore and therefore that section first to react with a dilute mineral acid would have a substantially increased permeability and very substantially decreased mechanical strength to the point of disintegration. The section of the cement barrier farthest from the wellbore, and so last to be contacted by the spent dilute mineral acid, would be virtually unaffected by the spent acid, and so would have insufficient permeability for the passage of formation hydrocarbon fluids therethrough.

One especially attractive and unique feature of the present invention is the ability to monitor the progress of the treating method and thereby adjust the reaction time of the treating composition to produce the desired cement barrier permeability. By measuring the pressure and flow rate of the treating composition during the injection thereof into the hardened cement barrier, a good indication of the extent of improvement in permeability of the said cement barrier can be obtained. The treating composition can be left in contact with the cement barrier for whatever time is required to achieve the desired permeability increase, and then removed before excessive reaction and consequent reduction in compressive strength has occurred.

The permeable cement barrier formed in accordance with the teachings U. S. Pat. No. 3,428,121 and U. S. Pat. No. 3,429,373 may be treated with the treating composition of the present invention to increase the permeability of the permeable cement barrier immediately after completion of the field procedure described in these above cited patents, to reduce anomalously low permeability resulting from faulty field procedure, or the treatment may be carried out some time after formation of the permeable cement barrier to correct a decrease in permeability resulting from plugging of the cement barrier by fine suspended material which is deposited against or within the cement barrier by formation fluid. In either event, the treating composition and procedures for injecting same into the cement barrier are identical.

In formulating the treating composition of this invention, an aqueous solution of from 3 to about 30 percent by weight of a non-oxidizing mineral acid such as hydrochloric acid, sulfuric acid, etc., is first prepared. An inhibitor to prevent corrosion of acid on the metal equipment associated with the well is usually added with mixing in the next step. The vinylpyrrolidone polymer in an amount within the concentration range of from 0.1 to about 10 percent by weight based on the total solution weight is then admixed with the aqueous acid solution employing a blender. The polymer dissolves rather rapidly in the acid solution. The composition is forced via a suitable pumping system, down the wellbore and into contact with the cement barrier to be treated. The pressure employed is determined by the permeability of the cement barrier, the viscosity of the fluid and other operating variables. The injection of this treating composition should be carried out at a pressure sufficient merely to penetrate the cement barrier. Generally, it is advisable to allow the aqueous acidic polymer solution to remain in contact with the cement barrier for sufficient time to achieve the desired improvement in permeability or until measurements of flow rate and injection pressures during the injection of the treating composition indicate the desired cement barrier permeability has been obtained. After this, the substantially spent treating solution is reversed out of the well, i.e., it is allowed to flow back out or to be pumped out of the cement barrier.

Water-soluble vinylpyrrolidone polymers useful in preparing the novel compositions of this invention include those having recurring units of the formula:

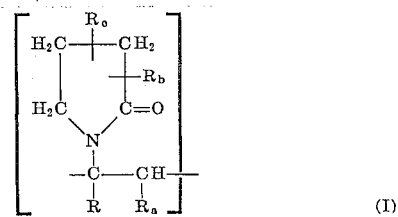

(I)

wherein R, $R_a$, $R_b$ and $R_c$ are independently selected from the group consisting of hydrogen and alkyl radicals having from 1 to 5 inclusive carbon atoms are employed. Examples of alkyl radicals of 1 to 5 inclusive carbon atoms include methyl, ethyl, propyl, butyl, pentyl and isomeric forms thereof. The average molecular weight of the vinylpyrrolidone polymer utilized in the method of this invention generally will be from about 10,000 to about 1,000,000 or more and, preferably from about 10,000 to about 400,000. It is critical in the practice of the present invention that the vinylpyrrolidone polymer be soluble in the aqueous acid. When R, $R_a$, $R_b$ and $R_c$ of Formula I above are each hydrogen, the resulting compound is polyvinylpyrrolidone, i.e., poly-N-vinyl-2-pyrrolidone, which is an especially useful polymer.

Preferably, the acidic polymer solution of this invention is one comprising an aqueous solution of about 3 to about 30 percent by weight of a non-oxidizing mineral acid, which may or may not include brine, and which contains dissolved therein between about 0.1 to about 10 percent by weight based on the total solution weight of the water-soluble vinylpyrrolidone polymer.

Generally, the acidic polymer solution will contain an inhibitor to prevent or greatly reduce the corrosive attack of the acid on metal. Any of a wide variety of compounds known in the art and employed for this purpose can be used. Compounds of arsenic, nitrogen or sulfur as described by Grebe et al. in U. S. Pat. No. 1,877,504 or a rosin amine type as described in U. S. Pat. No. 2,758,970 would be suitable. The amount of the inhibitor utilized is not highly critical and it may be varied widely. Usually this amount is defined as a small but effective amount, e.g., from 0.02 percent to about 2.0 percent by weight or more of the acidic polymer solution.

The preparation of vinylpyrrolidone polymers suitable for use in the treating composition of this invention is described in Kirk-Othmer, *Encyclopedia of Chemical Technology*, Vol. 1, Second Edition, Interscience Publishers, New York, 1963, p. 205. Such vinylpyrrolidone monomers can be synthesized by reacting a carboxylic acid amide such as 2-pyrrolidone, 3-methyl-2-pyrrolidone, 4, 4-diethyl-2-pyrrolidone, 5-isobutyl-2-pyrrolidone, 4-methyl-2-pyrrolidone, etc., of the formula:

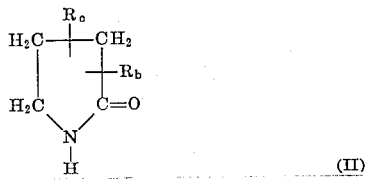

with acetylene or an acetylenic derivative of the formula:

$$RC \equiv CR_a,$$

wherein $R$ and $R_a$ have the same meaning as previously described, under pressure at a temperature of about 130° to about 160°C. and in the presence of the alkali metal salts of these acetylenic compounds as catalysts. Polymerization of the resulting monomers can be conducted by methods well known in the art.

Among the advantages resulting from employing the treating composition in treating cement barriers to improve the permeability thereof are the following:

1. The reaction rate of the acid with the acid-solubles in the cement barrier is greatly reduced. A problem encountered in the use of mineral acids for this purpose is the very rapid rate with which known mineral acids react with such acid-solubles so that little actual effect takes place at any great distance from the point of first contact between the mineral acid and the cement barrier. This rapid erosion of acid-solubles would likely lead to mechanical failure of the cement barrier.

2. The viscosity of the treating composition is increased. This helps promote uniform penetrating of the cement barrier.

The following is a description by way of example of tests demonstrating the effectiveness of the present invention.

In the first series of tests, a cement composition was prepared by mixing 1,400 grams of 20–40 mesh Ottawa sand, 254 grams of a light weight hydraulic cement, and 175 ml. of a brine prepared by dissolving 3 grams of calcium chloride and 30 grams of sodium chloride in 100 milliliters of water. Cylindrical plugs were prepared from this cement composition and their compressive strengths measured after the plugs had hardened for several hours.

The plugs were weighed and mounted in Hassler sleeves so that the treating composition could be passed therethrough. In each run, the plug was first water-wet by passing 250 milliliters of distilled water therethrough, followed by the treating solution. The partially spent acid solution was collected for subsequent analysis. A final volume of water was passed through the plug to remove the acid completely. The plug residue was dried overnight and then weighed to determine the weight loss due to acid dissolution, and the mechanical compressive strength was measured. In Run A, 15 percent hydrochloric acid was passed through a plug. In Run B, 15 percent hydrochloric acid having dissolved therein 0.5 percent polyvinylpyrrolidone of molecular weight 360,000 was passed through a second plug. In Run C, 15 percent hydrochloric acid having dissolved therein 1.0 percent polyvinylpyrrolidone of molecular weight 360,000 was passed through a third plug. The results tabulated in Table I were obtained.

TABLE I

| Treatment | Core Weight Loss, (gm) | Ca$^{++}$ in Spent Acid Solution (ppm) | Compressive Strength (psi)* |
|---|---|---|---|
| A—15% HCL | 1.2855 | 12,400 | (Core disintigrated) |
| B—15% HCL+ 0.5% PVP | 0.6344 | 4,400 | 100 |
| C—15% HCL+ 1.0% PVP | 0.6836 | 3,200 | 175 |

*average compressive strength before treatment was 1,120 psi.

The data in Table I show the superiority of the retarded acid in achieving the desired results. The lower weight loss and lower concentration of calcium in the partially spent acid solution in the tests wherein the retardant of the subject invention is used indicate a reduced rate of dissolution of acid-soluble components of the cement matrix. The compressive strength measurements indicate that use of retarted acid preserves the mechanical integrity of the cement matrix, whereas conventional, unretarded acid completely destroys the cement matrix.

In a second series of tests the viscosity of solutions of 0.5 percent and 1 percent by weight of the same polyvinylpyrrolidone polymer employed in the first series of tests dissolved in 15 percent by weight aqueous hydrochloric acid over extended periods of time was measured. Many polymeric materials hydrolyze or otherwise decompose in mineral acids over relatively short periods of time.

Accordingly, the viscosity of the above-described polymer solutions in hydrochloric acid was measured over a period of 28 days. The results are set forth in Table II.

TABLE II

| Concentration of Additive | Days Elapsed | Relative Viscosity (% in 15% HCl) | |
|---|---|---|---|
| | | 0.5 | 1 |
| Composition 15 % HCl | 0 | 1.00 | — |
| Solution of Additive in HCl | 3 | 1.99 | 3.40 |
| Solution of Additive in HCl | 14 | 1.93 | 3.32 |
| Solution of Additive in HCl | 28 | 1.92 | 3.28 |

The results depicted in Table II indicate that little, if any, decomposition of the polymer occurs over a period of 28 days.

I claim:

1. In a method of treating an incompetent, subterranean, petroleum-containing formation penetrated by a wellbore to prevent the movement of unconsolidated sand particles from said formation to the wellbore as formation fluids are recovered from said formation, wherein a mixture comprised of sand, acid-susceptible cement and water are injected via the wellbore against said formation and allowed to set so as to form a partially permeable cement barrier to restrain the flow of sand, the improvement which comprises injecting into the set cement barrier a treating composition comprising an aqueous mineral acid solution having dissolved therein a vinylpyrrolidone polymer to retard the rate of reaction between the cement barrier and the acidic treating composition, so that the permeability of the cement barrier to the flow of fluids is increased.

2. A method as described in claim 1 wherein the said acid component of the treating composition is selected from the group consisting of hydrochloric acid and sulfuric acid.

3. The method of claim 1 wherein the acidic solution has a concentration of from about 3 to about 30 percent by weight of the acid.

4. The method of claim 1 wherein the vinylpyrrolidone polymer comprises recurring units of the formula:

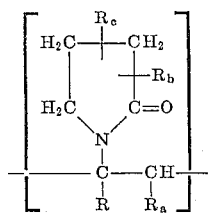

wherein $R$, $R_a$, $R_b$ and $R_c$ are independently selected from the group consisting of hydrogen and alkyl radicals having from 1 to 5 inclusive carbon atoms.

5. The method of claim 1 wherein the vinylpyrrolidone polymer has a molecular weight of from about 10,000 to about 1,000,000.

6. The method of claim 1 wherein the vinylpyrrolidone polymer has a molecular weight of from about 10,000 to about 400,000.

7. The method of claim 1 wherein the vinylpyrrolidone polymer is polyvinylpyrrolidone.

8. The method of claim 1 wherein the said vinylpyrrolidone polymer is present in a concentration of from about 0.1 to about 10 percent by weight based on the total solution weight of the vinylpyrrolidone polymer-acid solution.

9. The method of claim 1 wherein the treating composition is maintained in contact with the cement barrier for a time sufficient for the acid to react chemically with the acid-soluble components of the cement barrier and to etch passageways therethrough thereby increasing substantially the formation fluid flow capacity of the said cement barrier while still maintaining the effectiveness of the said cement barrier for restraining the flow of unconsolidated sand into the wellbore.

10. The method of claim 1 further comprising the step of removing the treating composition and its reaction products by reducing injection pressure and permitting said treating composition to flow back into the well.

11. The method of claim 1 further comprising the step of washing the cement barrier with salt water prior to injecting the acid-vinylpyrrolidone polymer solution.

12. A method for increasing the permeability of a permeable cement barrier in a wellbore penetrating an incompetent subterranean hydrocarbon-containing formation which comprises injecting into said cement barrier an aqueous solution of mineral acid having dissolved therein a vinylpyrrolidone polymer.

13. The method of claim 12 wherein said acid is selected from the group consisting of hydrochloric acid and sulfuric acid.

14. The method of claim 12, wherein said acid is hydrochloric acid.

15. The method of claim 12 wherein said acid is sulfuric acid.

16. The method of claim 12 wherein the acid solution has a concentration of from about 3 to about 30 percent by weight of the acid.

17. The method of claim 12 wherein the vinylpyrrolidone polymer comprises recurring units of the formula:

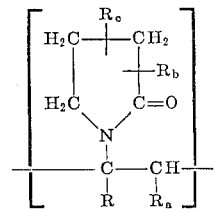

wherein $R$, $R_a$, $R_b$ and $R_c$ are independently selected from the group consisting of hydrogen and alkyl radicals having from 1 to 5 inclusive carbon atoms.

18. The method of claim 12 wherein the vinylpyrrolidone polymer has a molecular weight of from about 10,000 to about 1,000,000.

19. The method of claim 12 wherein the vinylpyrrolidone polymer has a molecular weight of from about 10,000 to about 400,000.

20. The method of claim 12 wherein the vinylpyrrolidone polymer is polyvinylpyrrolidone.

21. The method of claim 12 wherein the vinylpyrrolidone polymer is present in a concentration of from about 0.1 to about 10 percent by weight based on the total solution weight of the vinylpyrrolidone polymer-acid solution.

22. The method of claim 12 wherein the treating composition is maintained in contact with the cement barrier for a time sufficient for the acid to react chemically with the acid-soluble components of the cement barrier to etch passageways therethrough thereby increasing substantially the formation fluid flow capacity of the said cement barrier while still maintaining the effectiveness of the said cement barrier for restraining the flow of unconsolidated sand into the wellbore.

23. The method of claim 12 further comprising the step of removing the treating composition and its reaction products by reducing injection pressure and permitting said treating composition to flow back into the well.

24. The method of claim 12 further comprising the step of washing the face of the permeable cement barrier with salt water before injecting the acid-vinylpyrrolidone polymer solution.

25. The method of claim 12 further comprising the step of washing the cement barrier with salt water after the treating composition has reacted with the cement barrier to remove the residual acid-polymer and reaction products.

* * * * *